(12) United States Patent
Lehmann et al.

(10) Patent No.: US 12,064,075 B2
(45) Date of Patent: Aug. 20, 2024

(54) SYSTEM FOR ASCERTAINING FRESH WATER CONSUMPTION BY A DISHWASHER

(71) Applicant: ILLINOIS TOOL WORKS INC., Glenview, IL (US)

(72) Inventors: Sven Lehmann, Appenweier (DE); Dominik Schneider, Hohburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 619 days.

(21) Appl. No.: 17/270,211

(22) PCT Filed: Jul. 23, 2019

(86) PCT No.: PCT/US2019/042903
§ 371 (c)(1),
(2) Date: Feb. 22, 2021

(87) PCT Pub. No.: WO2020/023433
PCT Pub. Date: Jan. 30, 2020

(65) Prior Publication Data
US 2021/0330171 A1 Oct. 28, 2021

(30) Foreign Application Priority Data
Jul. 26, 2018 (DE) .................. 10 2018 118 108.6

(51) Int. Cl.
*A47L 15/42* (2006.01)
*A47L 15/00* (2006.01)
*G01F 1/34* (2006.01)

(52) U.S. Cl.
CPC ....... *A47L 15/4297* (2013.01); *A47L 15/0076* (2013.01); *A47L 15/4217* (2013.01);
(Continued)

(58) Field of Classification Search
CPC ............. A47L 15/4297; A47L 15/0076; A47L 15/4217; A47L 15/4285; A47L 2401/14;
(Continued)

(56) References Cited

U.S. PATENT DOCUMENTS

2003/0188767 A1  10/2003  Durfee
2013/0008477 A1*  1/2013  Forst .................... A47L 15/421
                                                                141/1

FOREIGN PATENT DOCUMENTS

DE        3900705 A1    7/1990
DE        4222240 A1    1/1994
(Continued)

OTHER PUBLICATIONS

PCT, European Patent Office (ISA/EP), International Search Report and Written Opinion, International Application No. PCT/US2019/042903, 16 pages (Oct. 1, 2019).

*Primary Examiner* — Benjamin L Osterhout
(74) *Attorney, Agent, or Firm* — THOMPSON HINE LLP

(57) ABSTRACT

A system for ascertaining fresh water consumption by an, in particular, commercial dishwasher (1) or a component thereof. The system includes a container (12, 22) for temporarily storing liquids, wherein the container (12, 22) has a liquid inlet (25), which can be flow-connected to a fresh water source if required, and a liquid outlet (23), which can be flow-connected to a freshwater consuming means, in particular a freshwater consuming means of the dishwasher (1), if required. The system further includes at least one pressure sensor (B3, B4) for detecting an, in particular, hydrostatic pressure in the container (12, 22), and an evaluation device which is designed to ascertain a fresh water volume flow into the container (12, 22) depending on at least one output value of the at least one pressure sensor (B3, B4).

11 Claims, 4 Drawing Sheets

(52) U.S. Cl.
CPC ........... *A47L 15/4285* (2013.01); *G01F 1/34*
(2013.01); *A47L 15/4244* (2013.01); *A47L 2401/09* (2013.01); *A47L 2401/14* (2013.01); *A47L 2401/20* (2013.01); *A47L 2501/04* (2013.01)

(58) Field of Classification Search
CPC ........... A47L 2401/20; A47L 2501/04; A47L 15/4244; A47L 2401/09; G01F 1/34
See application file for complete search history.

(56) References Cited

FOREIGN PATENT DOCUMENTS

| | | | | |
|---|---|---|---|---|
| DE | 102008031249 A1 | 1/2010 | | |
| EP | 2382908 A1 | 11/2011 | | |
| EP | 2413106 A1 * | 2/2012 | ......... | A47L 15/0023 |
| EP | 2413106 A1 | 2/2012 | | |
| GB | 2541394 A | 2/2017 | | |
| WO | 2013/059141 A2 | 4/2013 | | |
| WO | WO-2013059141 A2 * | 4/2013 | ......... | A47L 15/0031 |

\* cited by examiner

| Time | Boiler pressure in V | State of filling valve | |
|---|---|---|---|
| 08:42:54 | 0.47 | 0 | |
| 08:42:55 | 0.47 | 1 | |
| 08:42:56 | 0.47 | 1 | |
| 08:42:57 | 0.49 | 1 | |
| 08:42:58 | 0.5 | 1 | |
| 08:42:59 | 0.51 | 1 | |
| 08:43:00 | 0.54 | 1 | |
| 08:43:01 | 0.53 | 1 | |
| 08:43:02 | 0.56 | 1 | |
| 08:43:03 | 0.57 | 1 | |
| 08:43:04 | 0.58 | 1 | |
| 08:43:05 | 0.57 | 1 | |
| 08:43:06 | 0.59 | 1 | |
| 08:43:07 | 0.6 | 1 | Start of measurement |
| 08:43:08 | 0.6 | 1 | Current measurement |
| 08:43:09 | 0.61 | 1 | |
| 08:43:10 | 0.63 | 1 | |
| 08:43:11 | 0.64 | 1 | |
| 08:43:12 | 0.64 | 1 | |
| 08:43:13 | 0.67 | 1 | |
| 08:43:14 | 0.67 | 1 | |
| 08:43:15 | 0.69 | 1 | |
| 08:43:16 | 0.68 | 1 | |
| 08:43:17 | 0.7 | 1 | |
| 08:43:18 | 0.71 | 1 | |
| 08:43:19 | 0.72 | 1 | |
| 08:43:20 | 0.73 | 1 | |
| 08:43:21 | 0.74 | 1 | |
| 08:43:22 | 0.75 | 1 | End of measurement |
| 08:43:23 | 0.75 | 1 | |
| 08:43:24 | 0.77 | 1 | |

*FIG. 2*

| Time | Boiler temperature | Pressure of boiler in V | State of filling valve | Filling level of boiler | |
|---|---|---|---|---|---|
| 08:42:54 | 74 | 0.47 | 0 | 0.000 | |
| 08:42:55 | 74 | 0.47 | 1 | 0.000 | |
| 08:42:56 | 74 | 0.47 | 1 | 0.000 | |
| 08:42:57 | 74 | 0.49 | 1 | 0.000 | |
| 08:42:58 | 73 | 0.5 | 1 | 0.000 | |
| 08:42:59 | 74 | 0.51 | 1 | 0.000 | |
| 08:43:00 | 73 | 0.54 | 1 | 0.000 | |
| 08:43:01 | 73 | 0.53 | 1 | 0.000 | |
| 08:43:02 | 72 | 0.56 | 1 | 0.000 | |
| 08:43:03 | 72 | 0.57 | 1 | 0.000 | |
| 08:43:04 | 72 | 0.58 | 1 | 0.000 | |
| 08:43:05 | 71 | 0.57 | 1 | 0.000 | |
| 08:43:06 | 71 | 0.59 | 1 | 0.000 | |
| 08:43:07 | 70 | 0.6 | 1 | 0.000 | Start of measurement |
| 08:43:08 | 70 | 0.6 | 1 | 0.000 | |
| 08:43:09 | 70 | 0.61 | 1 | 0.087 | |
| 08:43:10 | 69 | 0.63 | 1 | 0.262 | |
| 08:43:11 | 69 | 0.64 | 1 | 0.349 | |
| 08:43:12 | 68 | 0.64 | 1P | 0.349 | |
| 08:43:13 | 68 | 0.67 | 1 | 0.611 | |
| 08:43:14 | 67 | 0.67 | 1 | 0.611 | Current measurement |
| 08:43:15 | 67 | 0.69 | 1 | 0.786 | |
| 08:43:16 | 66 | 0.68 | 1 | 0.699 | |
| 08:43:17 | 66 | 0.7 | 1 | 0.873 | |
| 08:43:18 | 65 | 0.71 | 1 | 0.961 | |
| 08:43:19 | 65 | 0.72 | 1 | 1.048 | |
| 08:43:20 | 65 | 0.73 | 1 | 1.135 | |
| 08:43:21 | 65 | 0.74 | 1 | 1.223 | |
| 08:43:22 | 64 | 0.75 | 1 | 1.310 | End of measurement |
| 08:43:23 | 64 | 0.75 | 1 | 1.310 | |
| 08:43:24 | 64 | 0.77 | 1 | 1.485 | |

*FIG. 3*

| Time | Boiler temperature | Pressure of boiler in V | State of filling valve | Filling level of boiler | Subtraction |
|---|---|---|---|---|---|
| 08:42:54 | 74 | 0.47 | 0 | 0.000 | 0.000 |
| 08:42:55 | 74 | 0.47 | 1 | 0.000 | 0.000 |
| 08:42:56 | 74 | 0.47 | 1 | 0.000 | 0.000 |
| 08:42:57 | 74 | 0.49 | 1 | 0.000 | 0.000 |
| 08:42:58 | 73 | 0.5 | 1 | 0.000 | 0.000 |
| 08:42:59 | 74 | 0.51 | 1 | 0.000 | 0.000 |
| 08:43:00 | 73 | 0.54 | 1 | 0.000 | 0.000 |
| 08:43:01 | 73 | 0.53 | 1 | 0.000 | 0.000 |
| 08:43:02 | 72 | 0.56 | 1 | 0.000 | 0.000 |
| 08:43:03 | 72 | 0.57 | 1 | 0.000 | 0.000 |
| 08:43:04 | 72 | 0.58 | 1 | 0.000 | 0.000 |
| 08:43:05 | 71 | 0.57 | 1 | 0.000 | 0.000 |
| 08:43:06 | 71 | 0.59 | 1 | 0.000 | 0.000 |
| 08:43:07 | 70 | 0.6 | 1 | 0.000 | 0.000 |
| 08:43:08 | 70 | 0.6 | 1 | 0.000 | 0.000 |
| 08:43:09 | 70 | 0.61 | 1 | 0.087 | 0.087 |
| 08:43:10 | 69 | 0.63 | 1 | 0.262 | 0.175 |
| 08:43:11 | 69 | 0.64 | 1 | 0.349 | 0.087 |
| 08:43:12 | 68 | 0.64 | 1 | 0.349 | 0.000 |
| 08:43:13 | 68 | 0.67 | 1 | 0.611 | 0.262 |
| 08:43:14 | 67 | 0.67 | 1 | 0.611 | 0.000 |
| 08:43:15 | 67 | 0.69 | 1 | 0.786 | 0.175 |
| 08:43:16 | 66 | 0.68 | 1 | 0.699 | 0.000 |
| 08:43:17 | 66 | 0.7 | 1 | 0.873 | 0.175 |
| 08:43:18 | 65 | 0.71 | 1 | 0.961 | 0.087 |
| 08:43:19 | 65 | 0.72 | 1 | 1.048 | 0.087 |
| 08:43:20 | 65 | 0.73 | 1 | 1.135 | 0.087 |
| 08:43:21 | 65 | 0.74 | 1 | 1.223 | 0.087 |
| 08:43:22 | 64 | 0.75 | 1 | 1.310 | 0.087 |
| 08:43:23 | 64 | 0.75 | 1 | 1.310 | 0.000 |
| 08:43:24 | 64 | 0.77 | 1 | 1.485 | 0.175 |

*FIG. 4*

SYSTEM FOR ASCERTAINING FRESH WATER CONSUMPTION BY A DISHWASHER

TECHNICAL FIELD

The present invention generally relates to the commercial dishwashing sector and, more specifically, relates to a system for ascertaining fresh water consumption by an in particular commercial dishwasher or a component thereof, and to a corresponding method for ascertaining fresh water consumption.

The invention furthermore relates to a dishwasher, in particular commercial dishwasher, having a system for ascertaining fresh water consumption by the dishwasher.

The dishwasher according to the invention is in particular designed as an automatic program washer or conveyor ware washer and has a container for temporarily storing liquids, wherein the container has a liquid inlet which can be flow-connected to a fresh water source if required, and a liquid outlet which can be flow-connected to a freshwater consuming means, in particular a freshwater consuming means of the dishwasher, if required. According to embodiments of the dishwasher according to the invention, the container for temporarily storing liquids is in particular a fresh water container and/or a fresh water booster.

BACKGROUND

Automatic program washers are dishwashers which can be manually loaded and unloaded. The automatic program washers can be dish rack tunnel dishwashers, also referred to as hood dishwashers, or front-loading dishwashers. Front-loading dishwashers can be undertable dishwashers, tabletop dishwashers, or front-loading freestanding dishwashers.

A dishwasher designed as an automatic program washer usually has a treatment chamber for cleaning ware to be washed. A washing tank in which liquid from the treatment chamber can flow back on account of gravity is typically disposed below the treatment chamber. Washing liquid which is usually water to which a detergent can be added is situated in the washing tank.

A dishwasher designed as an automatic program washer furthermore has a washing system having a washing pump, a line system connected to the washing pump, and washing nozzles. The washing liquid situated in the washing tank can be conveyed from the washing pump by way of the line system to the washing nozzles and be sprayed through the washing nozzles in the treatment chamber onto the ware to be washed. The sprayed washing liquid subsequently flows back into the washing tank.

Conveyor ware washers are in particular flight-type ware washers or rack conveyor ware washers. Conveyor ware washers are usually used in the commercial sector. As opposed to automatic program washers which in some instances are also referred to as "single-tank machines" and in which the ware to be washed during the cleaning remains in a locationally fixed manner in the machine, a conveyance of the ware to be washed through various treatment zones of the conveyor ware washer takes place in the case of conveyor ware washers. Conveyor ware washers are typically embodied as multi-tank machines.

A conveyor ware washer usually has at least one pre-washing zone and at least one primary washing zone which, when viewed in the conveying direction of the ware to be washed, is disposed behind the pre-washing zone(s). When viewed in the conveying direction, at least one post-washing zone and at least one rinsing zone disposed downstream of the post-washing zone(s) are typically disposed after the primary washing zone(s). When viewed in the conveying direction, the ware to be washed which are either received directly on the conveyor or are held by racks usually run, in the conveying direction, through an entry tunnel, the following pre-washing zone(s), primary washing zone(s), post-washing zone(s), rinsing zone(s), a drying zone, and into an exit section.

The mentioned washing zones of the conveyor ware washer are in each case assigned one washing system which has a washing pump and a line system (washing line system) connected to the washing pump by way of which liquid is supplied to the spray nozzles of the washing zone. The washing liquid supplied to the spray nozzles is sprayed onto the ware to be washed in the respective washing zone, said ware to be washed being conveyed through the respective washing zones by a conveying device of the conveyor ware washer. Each washing zone is assigned one tank in which sprayed liquid is received, and/or in which liquid for the spray nozzles of the respective zone is provided.

In the case of the conveyor ware washers typically known from the prior art, rinsing liquid in the form of fresh water which can be pure or to which further additives such as, for example, rinsing agents, can be added is sprayed onto the ware to be washed by way of the spray nozzles of the rinsing zone. At least part of the sprayed rinsing liquid by way of a cascading system is conveyed from zone to zone counter to the conveying direction of the ware to be washed.

The sprayed rinsing liquid is collected in a tank (post-washing tank) of the post-washing zone from where said rinsing liquid by way of the washing pump of the washing system associated with the post-washing zone is conveyed to the spray nozzles (post-washing nozzles) of the post-washing zone. Washing liquid is rinsed from the ware to be washed in the post-washing zone. The liquid created herein flows into the washing tank of the at least one primary washing zone which, when viewed in the conveying direction of the ware to be washed, is disposed upstream of the post-washing zone. The liquid here is usually provided with a detergent and by a pump system (washing pumps) that is associated with the washing system of the primary washing zone is sprayed onto the ware to be washed by way of the nozzles (washing nozzles) of the primary washing zone. In as far as no further primary washing zone is provided, the liquid flows from the washing tank of the primary washing zone and subsequently into the pre-washing tank of the pre-washing zone. The liquid in the pre-washing tank by way of a pump system associated with the washing system of the pre-washing zone is sprayed onto the ware to be washed by way of the pre-washing nozzles of the pre-washing zone so as to remove major contaminations from the ware to be washed.

Independently of whether the dishwasher is designed as an automatic program washer or as a conveyor ware washer, the dishwashers considered herein thus usually comprise at least one washing system which has a washing pump which across the duration of a washing process guarantees a quasi-consistent circulation of water in the treatment chamber (in the case of automatic program washers) or in the respective treatment zone (in the case of conveyor ware washers), respectively. The respective washing pumps of the washing systems are switched on or off, respectively, by a control device (machine controller) that is associated with the dishwasher.

At the start of each washing day the washing tank, or the individual washing tanks, respectively, of the dishwasher are first to be filled with water (typically fresh water). This initial filling however is not characteristic of the fresh water consumption of the dishwasher since the washing liquid is regenerated with fresh water continuously or if required in the operation of the dishwasher. In other words, in the operation of the dishwasher the latter is supplied with fresh water continuously or if required, said fresh water typically first serving for fresh water rinsing and then for regenerating the washing liquid.

The water consumption created in the operation of the dishwasher is an increasingly important operating cost variable. Herein, there is not only a requirement with a view to lowering the ongoing operating costs of a dishwasher, in particular commercial dishwasher, but from the point of view of the dishwasher operator there is also a growing interest in being able to control or detect, respectively, the ongoing operating costs and in particular the ongoing fresh water consumption of the dishwasher so as to be able to reliably calculate the ongoing operating costs of the washer.

In order for the fresh water consumption of a dishwasher to be ascertained it is commonplace in commercial dishwashing for an impeller sensor to be used in a fresh water supply line to the dishwasher. This impeller sensor, as a function of a water inflow, transmits corresponding impulses to a controller of the dishwasher. The controller by means of the impulses then calculates the fresh water volume flow supplied to the dishwasher and thus the water consumption.

This method is sufficiently accurate and available in approx. 40% to 50% of the commercial dishwashers produced annually. The remaining dishwashers do not possess a corresponding impeller sensor or the possibility for a corresponding impeller sensor to be installed in a fresh water supply line. In the case of these dishwashers the fresh water consumption is calculated, specifically in that the duty cycle of a filling valve provided in the fresh water supply line is detected. Said duty cycle is usually multiplied by a fixedly predefined volume flow so as to calculate the fresh water volume flow into the dishwasher and thus the fresh water consumption by the dishwasher. The fixedly predefined volume flow is 3 l/min, for example.

However, this approach is rather inaccurate since a fixedly predefined volume flow is assumed when calculating the fresh water consumption. When the volume flow actually present in the washer (actual volume flow) is above or below the assumed value, this has a direct effect on the calculated fresh water consumption. The deviation created on account thereof can be more than 60%.

SUMMARY

The present invention is based on the object of specifying a system by way of which fresh water consumption by an in particular commercial dishwasher or a component thereof can be ascertained as accurately as possible even when no impeller sensor is able to be used in a fresh water supply line of the dishwasher. A corresponding dishwasher and also a corresponding method for ascertaining fresh water consumption are furthermore to be specified.

In terms of the system, the object on which the invention is based is achieved by the subject matter of independent patent claim 1, wherein advantageous refinements of the system according to the invention are stated in the corresponding dependent patent claims.

Accordingly, a system, in particular, for ascertaining fresh water consumption by an in particular commercial dishwasher or a component thereof is proposed, wherein the system has a container for temporarily storing liquids, at least one pressure sensor for detecting an in particular hydrostatic pressure in the container, and an evaluation device. The container for temporarily storing liquids has a liquid inlet which can be flow-connected to a fresh water source if required. The container for temporarily storing liquids furthermore has a liquid outlet which can be flow-connected to a freshwater consuming means, in particular a freshwater consuming means of the dishwasher, if required. The container for temporarily storing liquids can be integrated in the dishwasher. Said container for temporarily storing liquids herein is a fresh water container integrated in the dishwasher or embodied separately from the dishwasher, for example, or a fresh water boiler.

It is in particular provided according to the invention that the evaluation device is designed for ascertaining a fresh water volume flow into the container depending on at least one output value of the at least one pressure sensor. The fresh water consumption of the dishwasher, or of the component of the dishwasher, respectively, can then be ascertained directly by means of the ascertained fresh water volume flow into the container.

The solution according to the invention is distinguished in that the accuracy of a calculated fresh water consumption by the dishwasher can be significantly increased, even without the use of an impeller sensor mechanism, since—as opposed to the conventional approach described above—a value of the fresh water volume flow into the dishwasher, or into the container for temporarily storing liquids, respectively, is no longer fixedly predefined but is determined by the dishwasher per se. In this way, the true actual value of the fresh water volume flow into the dishwasher, or into the container for temporarily storing liquids, respectively, is introduced into the calculation of the fresh water consumption.

In order for said actual value of the fresh water volume flow to be able to be detected, the sensor mechanism already available in the dishwasher is preferably resorted to. A pressure sensor which is designed in particular for detecting a hydrostatic pressure in the container for temporarily storing liquids serves in particular to this end.

According to embodiments of the system according to the invention, the at least one pressure sensor can be designed to detect a time profile of an in particular hydrostatic pressure in the container over a defined or definable period of time. In this context it is expedient for the evaluation device to be furthermore designed to ascertain the actual value of a fresh water volume flow into the container and/or out of the container depending on a time profile of an output value of the at least one pressure sensor.

The at least one pressure sensor which is designed to detect an in particular hydrostatic pressure in the container for temporarily storing liquids should be arranged with respect to the container and in particular inside the container in such a manner that an output value of the at least one pressure sensor is static provided that a filling level (liquid filling level) in the container lies below a defined or definable minimum level. By contrast, the output value of the at least one pressure sensor should be dynamic at least when the filling level (liquid filling level) in the container lies between the minimum level and a defined or definable maximum level. This range will also be referred to hereunder as the "dynamic measuring range" or "dynamic range".

Of course, it is also conceivable for a pressure sensor which operates in a dynamic range across the entire container content to be used.

The output value of the at least one pressure sensor in the dynamic range of the latter preferably varies proportionally in relation to the filling level (liquid filling level) in the container. Depending on the shape of the container and the geometry of the container, the output value of the at least one pressure sensor in the dynamic range of the latter can vary in a linearly proportional manner in relation to the filling level in the container. However, this linear correlation does not apply when the container has a shape which is different from a hollow-cylindrical shape.

According to embodiments, the evaluation device is designed, at least in a dynamic range of the at least one pressure sensor, to assign a filling level in the container and/or a liquid volume which is filled into the container preferably to each output value of the at least one pressure sensor.

According to implementations of the system according to the invention, the liquid inlet of the container is flow-connected or can be flow-connected to the fresh water source by means of a preferably actuable valve. A device for detecting a valve position of the actuable valve is furthermore preferably provided. Of course, other solutions for flow-connecting the liquid inlet of the container to the fresh water source if required may also be considered.

According to advantageous embodiments of the system according to the invention the latter can be operated in a learning mode in which an actual value of a fresh water volume flow via the liquid inlet into the container is ascertained or can be ascertained. This is in particular performed in a state in which an actuable valve which is assigned to the liquid inlet is in the opened valve position thereof.

The learning mode comprises in particular the step of defining a reference volume in the container, and the step of detecting a time period which is required in order to supply a fresh water volume, which corresponds to the reference volume, via the liquid inlet to the container in the opened valve position.

The reference volume in the container is preferably defined in such a way that the output value of the at least one pressure sensor dynamically changes from a starting value to an end value when the reference volume is supplied as a liquid to the container.

Defining the reference volume can furthermore comprise the ascertaining or estimating of a volume value of the reference volume. For example, for the purpose of ascertaining the reference volume, the reference volume is measured, in particular volumetrically calibrated. Alternatively or additionally thereto, it is conceivable that for the purpose of ascertaining the reference volume, an appropriate mathematical function which represents a theoretical correlation between a filling level (liquid filling level) in the container and the corresponding filling volume is formed or resorted to, respectively.

The learning mode of the system according to the invention preferably furthermore comprises the step of determining a volume flow via the liquid inlet into the container in the opened valve position, specifically while taking into account an ascertained volume value of the reference volume and the detected time period.

According to preferred implementations of the system according to the invention, the learning mode comprises the step of determining a correlation between an output value of the at least one pressure sensor and a filling level (liquid filling level) in the container, wherein said correlation is then preferably stored in the form of a mathematical function or a corresponding lookup table in the evaluation device or a storage device of the evaluation device, respectively, of the system.

Alternatively or additionally, the learning mode furthermore comprises the step of determining a correlation between an output value of the at least one pressure sensor and a corresponding filling volume in the container, wherein said correlation is again preferably stored as a mathematical function or as a lookup table, in particular in a storage device that is assigned to the evaluation device of the system according to the invention.

The solution according to the invention does not only relate to a system for ascertaining fresh water consumption by an in particular commercial dishwasher or a component thereof, but also to a dishwasher per se, wherein said in particular commercial dishwasher is provided with such a system. The container for temporarily storing liquids herein can in particular be a container integrated in the dishwasher, such as a fresh water container and/or a fresh water boiler.

Finally, the invention furthermore relates to a method for ascertaining fresh water consumption by an in particular commercial dishwasher or a component thereof, wherein an in particular hydrostatic pressure in a container for temporarily storing liquids is detected in particular with the aid of a pressure sensor, and wherein a fresh water volume flow into the container is ascertained depending on at least one output value of the at least one pressure sensor.

The fresh water consumption ascertained by way of the system according to the invention, or the method according to the invention, respectively, can be transmitted by way of the internet, a company-internal intranet, or by way of conventional telecommunication paths (ISDN, telephone) directly to the dishwasher operator or to an external device (server) so as to optimize in particular the calculation of the operating costs of the dishwasher.

BRIEF DESCRIPTION OF THE DRAWINGS

The invention will be described in more detail hereunder with reference to the appended drawing.

In the drawings:

FIG. 2 shows an exemplary measurement protocol for ascertaining the volume flow according to one aspect of the present invention;

FIG. 3 shows an exemplary measurement protocol for ascertaining the volume flow according to a second aspect of the present invention; and FIG. 4 shows an exemplary measurement protocol for ascertaining the fresh water consumption according to one aspect of the present invention.

DETAILED DESCRIPTION

Figure 1:
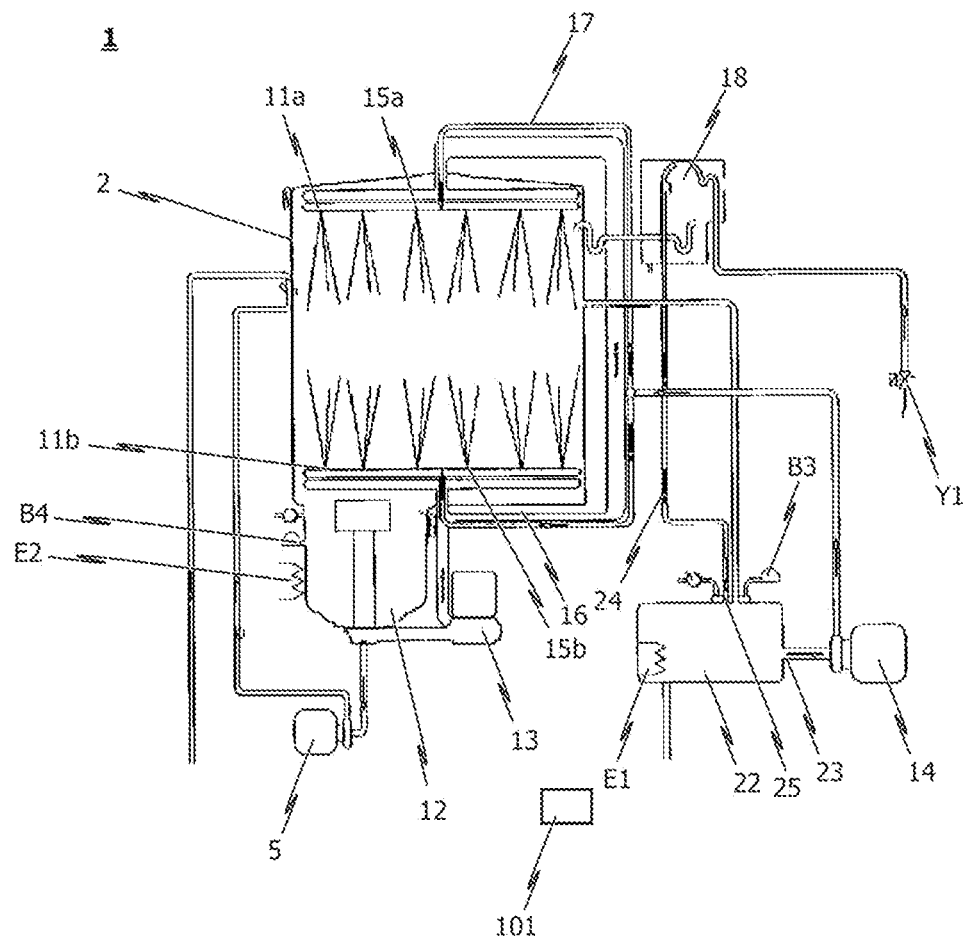
FIG. 1 shows a hydraulics diagram of a dishwasher designed as an automatic program washer according to an exemplary embodiment of the invention.

A hydraulics diagram of an exemplary embodiment of the dishwasher 1 according to the invention is illustrated in FIG. 1. It is to be noted here that, while the exemplary embodiment of the dishwasher according to the invention 1 according to FIG. 1 is embodied in the form of an automatic program washer, the invention is not limited to dishwashers in the form of automatic program washers; rather, the invention also relates in particular to dishwashers which are designed as conveyor ware washers.

The exemplary embodiment of the dishwasher 1 designed as an automatic program washer has a program control device 101 for controlling at least one cleaning program, and, for receiving ware to be cleaned (not shown in FIG. 1) such as, for example, dishes, cutlery, pots, pans, and trays, a treatment chamber 2 which is capable of being closed by a door (not shown in FIG. 1) or a hood (likewise not shown in FIG. 1).

A washing tank 12 for receiving sprayed liquid from the treatment chamber 2 is situated below the treatment chamber 2. A washing pump 13 is provided for conveying washing liquid from the washing tank 12 through a washing liquid line system 16 to washing nozzles 11a, 11b which in the treatment chamber 2 are directed onto the region of the ware to be cleaned and spray the washing liquid onto the ware to be cleaned. On account of gravity, the sprayed washing liquid drops back into the washing tank 12. On account thereof, the washing tank 12, the washing pump 13, the washing liquid line system 16, the washing nozzles 11a, 11b, conjointly with the treatment chamber 2, form a washing liquid circuit. The washing liquid line system 16 connects the pressure side of the washing pump 13 to the corresponding washing nozzles 11a, 11b.

A rinsing system for conveying rinsing liquid by means of a rinsing pump 14 through a rinsing line system 17 to rinsing nozzles 15a, 15b is furthermore provided, said rinsing nozzles 15a, 15b in the treatment chamber 2 being directed onto the region of the ware be cleaned. The sprayed rinsing liquid on account of gravity drops from the treatment chamber into the washing tank 12. The rinsing liquid line system 17 connects the pressure side of the rinsing pump 14 to the rinsing nozzles 15a, 15b.

A multiplicity of washing nozzles 11a are preferably provided on at least one upper washing arm, a multiplicity of washing nozzles 11b are preferably provided on at least one lower washing arm, a multiplicity of rinsing nozzles 15a are preferably provided on at least one upper rinsing arm, and a multiplicity of rinsing nozzles 15b are preferably provided on at least one lower rinsing arm.

Before rinsing liquid is sprayed during a rinsing phase, a quantity of washing liquid that corresponds to the rinsing liquid is in each case pumped out of the washing tank 12 by means of an outlet pump 5, the suction side of the latter by way of a discharge line being connected to a sump of the washing tank 12.

When the washing tank 12 is empty prior to an initial start of the dishwasher 1 designed as an automatic program washer, said washing tank 12 first has to be filled with fresh water by way of a fresh water line, or with fresh water or another rinsing liquid or washing liquid by means of the rinsing system and the rinsing pump 14 thereof. The rinsing liquid can be fresh water or fresh water mixed with a rinsing agent. The washing liquid contains detergent which by a detergent metering device (not shown in FIG. 1) is preferably automatically metered to the liquid contained in the washing tank 12.

The program control device 101 controls the washing pump 13, the rinsing pump 14, the discharge pump 5 and a detergent release pump (not shown in FIG. 1) depending on the cleaning program chosen in each case by an operator at the program control device 101. At least one cleaning program is provided; a plurality of optionally selectable cleaning programs are preferably provided.

In the case of the exemplary embodiment of the dishwasher 1 according to the invention, schematically illustrated in FIG. 1, the rinsing pump 14 by way of the suction side thereof is connected to an outlet 23 of a boiler 22. The boiler 22 furthermore has an inlet 25 which is connected to a fresh water supply line 24 and by way of which the boiler 22 is supplied either fresh water or fresh water with a metered rinsing agent added thereto. The liquid (pure fresh water of fresh water with a metered rinsing agent added thereto) supplied by way of the inlet 25 is heated in the boiler 22 according to a predefined process procedure. The rinsing liquid heated in the boiler 22, by way of the rinsing pump 14 that by way of the suction side thereof is connected to the boiler outlet 23, can be supplied by way of the rinsing line system 14 to the rinsing nozzles 15a and 15b, respectively, for example during a fresh water/rinsing phase. The rinsing nozzles 15a and 15b, respectively, are disposed in the treatment chamber 2 of the dishwasher 1 so as to spray the rinsing liquid heated by the boiler 22 onto the ware to be washed in the treatment chamber 2. Of course, it is also conceivable that the boiler 22 by way of the inlet 25 and the fresh water supply line 24 is supplied pure fresh water to which, upon being heated in the boiler 22, a rinsing agent is added in a metered manner.

While not illustrated in FIG. 1, a fresh water container without heating can additionally or alternatively to the boiler 22 also be assigned to the exemplary embodiment of the dishwasher 1 according to the invention. Said fresh water container herein preferably has an inlet which is connected to a fresh water supply line by way of which pure fresh water or fresh water with a metered rinsing agent added thereto is supplied to the fresh water container again.

Of course, it is however also conceivable for a metering installation for adding rinsing agent in a metered manner to be disposed downstream, behind the outlet of the fresh water container.

In the case of the embodiment of the dishwasher 1 according to the invention, schematically illustrated in FIG. 1, the boiler 22 (and if present also the fresh water container) is/are connected to a return suction preventer 18 by way of at least one fresh water supply line. The return suction preventer 18 serves to prevent fresh water from being able to be suctioned back from the suction side of the rinsing pump 14, or from a (further) rinsing pump assigned to the fresh water container not shown in the drawings, into a fresh water supply line 30.

While likewise not illustrated in FIG. 1, the return suction preventer 18 can have an outlet which by way of a fresh water supply line is connected to a water softening device. The water softening device can have a salt container that is connected to the fresh water supply line, on the one hand, and have first and second water softeners which are disposed in a mutually parallel manner, on the other hand. The two water softeners disposed in a mutually parallel manner can be connected to the outlet of the return suction preventer 18 by way of a corresponding fresh water line system and the fresh water supply line.

The water softeners of the water softening device by way of suitable actuation of valves can be operated in an alternating manner so as to soften the fresh water supplied to the boiler 22 by way of the fresh water supply lines, and the (if present) fresh water supplied to the fresh water container by way of the fresh water supply line.

The water flow within the dishwasher schematically illustrated in FIG. 1 is as follows: the fresh water makes its way via a filling valve Y1 and the return suction preventer 18 into the boiler 22. If required, the fresh water therein is heated by the heater E1. The liquid filling level in the boiler 22 is detected by a pressure sensor B3. The fresh water optionally heated in the boiler 22 is pumped by way of the rinsing pump 14 and the rinsing nozzles 15a, 15b into the treatment chamber 2 of the dishwasher 1. The fresh water sprayed in the treatment chamber 2 accumulates in the washing tank 12. A heater E2 for maintaining the liquid accumulated in the washing tank 12 at the correct temperature is preferably provided in the washing tank 12. The liquid filling level of the washing tank 12 can be detected by way of a pressure sensor B4. After a washing phase, part of the liquid (washing liquid) accumulated in the washing tank 12 is conveyed by the discharge pump 5 from the dishwasher 1 into a drain. This washing liquid that has been pumped off is replaced by fresh water or liquid, respectively, from the boiler 22.

In particular, the pressure sensor B3 used in the boiler 22, depending on the hydrostatic pressure in the boiler 22, supplies a corresponding voltage value. The respective associated pressure values are stated as a pressure/voltage diagram (for example as a graphic illustration or a table) by the manufacturer of the pressure sensor B3.

In other words, the output value of the pressure sensor B3 (electric voltage) by virtue of the known pressure/voltage diagram of the pressure sensor B3 can be assigned to a corresponding (hydrostatic) pressure value. However, this pressure value detected by the pressure sensor B3 depends on the installation situation of the pressure sensor B3 in the boiler 22 and on the liquid filling level in the boiler 22. The output value (voltage value) of the pressure sensor B3 is thus also dependent on the liquid filling level in the boiler 22.

According to embodiments of the solution according to the invention, the pressure sensor B3 by way of a hose can be connected to an air trap (not illustrated in FIG. 1).

In the case of the exemplary embodiment of the dishwasher 1 according to the invention shown in FIG. 1, the installation situation of the pressure sensor B3 in the boiler 22 is such that the pressure sensor B3 is pressure-free up to a specific liquid filling level in the boiler 22. A (hydrostatic) pressure is exerted on the pressure sensor B3 only therebeyond.

In other words, the output value of the pressure sensor B3 is static up to that liquid filling level at which the pressure sensor B3 is pressure-free. The dynamic range of the pressure sensor B3 is reached only from a liquid filling level in the boiler 22 at which a hydrostatic pressure is exerted on the pressure sensor B3.

In the context of the pressure sensor B3 used in the boiler 22 of the dishwasher 1 according to FIG. 1 said pressure sensor B3 in the static range thereof emits a first voltage value as the output value. Each higher voltage value in the dynamic range of the pressure sensor B3 can subsequently be assigned a liquid filling level in the boiler 22.

According to one exemplary embodiment, the pressure sensor B3 in the boiler 22 in the static range of said pressure sensor B3 emits a voltage value of 0.5 V as the output value. On account of the current boiler geometry, a voltage value of approx. 0.69 V, corresponding to 138 mm, corresponds to the "full" liquid filling level in this example.

In order for the fresh water volume flow, which by way of the filling valve V1 and the return suction preventer 18 makes its way into the dishwasher 1, to be ascertained, ascertaining a reference volume in the boiler 22 is first required according to one exemplary embodiment of the fresh water volume flow determination. Said reference volume has to be able to be completely detected by the pressure sensor B3 disposed in the boiler 22, or by the pressure sensor B3 assigned to the boiler 22, respectively. In other words, the reference volume is fixed such that said reference volume is in the dynamic range of the pressure sensor B3.

According to one exemplary embodiment, said reference volume is fixed to the voltage values 0.6 V to 0.75 V of the pressure senor B3.

A specific volume of, for example, 1.31 liters results for this range by measuring, or volumetrically calibrating, respectively, the boiler 22. The volume should be chosen ideally large in order for a long measuring period to be achieved. This reduces the influence of water movements in the boiler 22 during filling.

The effect of the sensing time is explained in the example hereunder.

The fresh water volume flow into the dishwasher 1 can be calculated by way of the defined voltage values of the pressure sensor B3 (corresponding to the liquid filling level in the boiler 22) and the ascertained volume of the reference volume. To this end, the time which is required until the upper filling level limit is reached is measured when the lower filling level limit is reached. The fresh water volume flow into the dishwasher 1 can be determined on account of the measured time and the known volume of the reference volume.

An exemplary measurement protocol for a corresponding fresh water volume flow determination is shown in FIG. 2. The time measurement herein starts at an output value of the pressure sensor B3 of 0.6 V, which is already in the dynamic range of the pressure sensor B3. The measurement terminates at an output value of the pressure sensor B3 of 0.75 V, wherein said output value is likewise (still) in the dynamic range of the pressure sensor B3. In the case of the measurement protocol illustrated in an exemplary manner in FIG. 2, a volume of 1.31 liters is assumed for this measuring range (reference volume). This volume has preferably been previously measured or volumetrically calibrated, respectively.

In the case of the example according to the measurement protocol in FIG. 2, the measurement starts at a liquid filling level in the boiler 22 corresponding to an output value of the pressure sensor of 0.6 V to 0.75 V. The time required for filling the volume of 1.31 liters in this range is 15 seconds, for example. A volume flow of 5.24 liters per minute can be calculated herewith.

In the example shown in FIG. 2 the sensing time has been chosen to be one second. Should said sensing time be subject to a deviation of one second, the calculated volume flow would be increased to 5.61 liters per minute, or reduced to 4.91 liters per minute, respectively. This corresponds to a deviation with an actual value of 7%. Said deviation can be minimized by increasing the sensing time to tenths of a second. This would then be reduced to 0.7%. The measurement can be carried out multiple times, if required. The individual fresh water volume flows can then be combined so as to form a mean value so as to equalize inaccuracies in the individual measurements.

Deviating from the afore-described measurement of the fresh water volume flow, the filled volume can also be calculated by way of the pressure. To this end, the defined volume is transferred to a mathematical equation. The type of equation depends on the geometric shape of the reference volume. Depending on the reference volume and the range thereof, different equations can be necessary in order for the correlation between pressure and liquid filling level to be described.

For example, when the reference volume corresponds to a cuboid, the correlation between the filling level and the volume can be described in the form of a linear equation, wherein the difference between the output value of the pressure sensor B3 at the end of the measurement and the output value of the pressure sensor B3 at the start of the measurement divided by the volume of the reference volume indicates the gradient of the straight line.

A measurement protocol of a corresponding fresh water volume flow determination is shown in an exemplary manner in FIG. 3. In the case of this measurement protocol, the measurement starts at an output value of the pressure sensor B3 of 0.6 V, corresponding to 0 liters of the reference volume, wherein the measurement terminates at an output value of the pressure sensor B3 of 0.75 V, corresponding to the volume of the reference volume (here: 1.31 liters).

The measurement results in that the filling level in the boiler 22 in the predefined measuring range has risen from 0 liters to 1.31 liters in 15 seconds. A fresh water volume flow of 5.24 liters per minute can be calculated therefrom. This measurement can again be carried out multiple times, if required, and the individual fresh water volume flows can be combined so as to form a mean value so as to equalize inaccuracies in the individual measurements.

An exemplary measurement protocol pertaining to the fresh water consumption determination with the aid of the pressure sensor B3 assigned to the boiler 22 is shown in FIG. 4.

Deviating from the afore-described measuring method, the fresh water consumption of the dishwasher 1 within a reference volume can be directly determined. To this end, an equation for calculating the current filling level in the boiler 22 is used, as has been explained above. The water consumption can be directly ascertained by recording said liquid filling level and by forming a difference as a function of the state of the filling valve V1.

In the case of the exemplary measurement protocol in FIG. 4, the output value of the pressure sensor B3 at the start of the measurement corresponds to 0.6 V, corresponding to 0 liters of the reference volume, wherein the measurement terminates at a boiler filling level at which the output value of the pressure sensor B3 is 0.75 V, corresponding to the reference volume of 1.31 liters.

When forming the difference between the individual measured values and the subsequent sum, a water consumption of 1.397 liters results.

Of course, it is conceivable for the different methods described above to be used in combination.

The solution according to the invention is also not limited to a hydrostatic pressure in the boiler 22 being measured by way of a pressure sensor B3 assigned to the boiler 22, said hydrostatic pressure subsequently being resorted to for ascertaining a fresh water volume flow in the boiler 22, rather, it is also conceivable for a pressure sensor B4 which is assigned to the washing tank 12, for example, to be used for the method or system, respectively, according to the invention.

Briefly summarizing, the solution according to the invention is distinguished in particular in that at least one corresponding sensor B3, B4 is used for identifying the filling level of, for example, the washing tank 12 and/or of the boiler 22 of the dishwasher 1. Said sensor B3, B4 is preferably a pressure sensor, wherein other sensors or measuring methods, respectively, in particular optical, inductive, capacitive, electromagnetic, or alternative measuring methods can however also be resorted to for identifying the filling level.

The fresh water volume flow in the container (boiler 22 or washing tank 12, respectively) herein is preferably determined by way of a hydrostatic pressure in the container 12, 22, a specific reference volume in the container 12, 22, and a required filling time.

Alternatively or additionally hereto, the fresh water volume flow into the container 12, 22 can be determined by means of a hydrostatic pressure in the container 12, 22, a specific mathematical function, and the required filling time.

Alternatively or additionally hereto, a fresh water consumption of the washer 1 can be calculated with the aid of a detected hydrostatic pressure in the container 12, 22, a specific mathematical function which corresponds to a liquid filling level in the container 12, 22 as a function of a hydrostatic pressure in the container 12, 22, and the liquid filling level in the container 12, 22 is permanently recorded in order for the overall fresh water consumption to be calculated from the differences between the individual measurements.

As used herein the term "freshwater consuming means" refers to any device, component or system that needs a source of fresh water, such as, for example, a desalination device, a softening device, a deionisation device, a rinse system or some other fresh water consumption path of a dishwasher.

The invention is not limited to the exemplary embodiments but rather is derived from a combined view of all of the features disclosed herein.

The invention claimed is:

1. A system for ascertaining fresh water consumption by a commercial dishwasher or a component thereof, wherein the system comprises:
   a container for temporarily storing liquids, wherein the container has a liquid inlet, which can be flow-connected to a fresh water source if required, and a liquid outlet, which can be flow-connected to a freshwater consuming means of the dishwasher, if required;
   at least one pressure sensor for detecting a hydrostatic pressure in the container; and
   an evaluation device which is designed to ascertain a fresh water volume flow into the container depending on at least one output value of the at least one pressure sensor;
   wherein the system includes a learning mode in which an actual value of a fresh water volume flow via the liquid inlet into the container is ascertained or can be ascertained, in a state in which an actuable valve which is associated with the liquid inlet is in its open valve position;
   wherein the learning mode comprises the following steps:
      defining a reference volume in the container, wherein the reference volume in the container is defined in such a way that the output value of the at least one pressure sensor dynamically changes, from a starting value to an end value, when the reference volume is supplied to the container, and wherein defining the reference volume further comprises ascertaining or estimating the volume value of the reference volume; and
      detecting a time period which is required in order to supply a fresh water volume, which corresponds to the reference volume, via the liquid inlet to the container in the open valve position.

2. The system as claimed in claim 1, wherein the at least one pressure sensor is designed to detect a time profile of the hydrostatic pressure in the container over a defined or definable time period;
and wherein the evaluation device is designed to ascertain the fresh water volume flow into the container depending on a time profile of an output value of the at least one pressure sensor.

3. The system as claimed in claim 2, wherein the at least one pressure sensor is inside the container in such a way that an output value of the at least one pressure sensor is static provided that a filling level in the container lies below a defined or definable minimum level, and is dynamic at least when the filling level in the container lies between the minimum level and a defined or definable maximum level.

4. The system as claimed in claim 3, wherein, in its dynamic range, the output value of the at least one pressure sensor changes proportionally in relation to the filling level in the container.

5. The system as claimed in claim 1, wherein the evaluation device is designed, at least in a dynamic range of the at least one pressure sensor, to assign a filling level in the container and/or a liquid volume which is filled into the container to each output value of the at least one pressure sensor.

6. The system as claimed in claim 1, wherein the liquid inlet of the container is flow-connected or can be flow-connected to the fresh water source by means of an actuable valve, wherein a device for detecting a valve position of the actuable valve is further provided.

7. The system as claimed in claim 1, wherein, for the purpose of ascertaining the reference volume, the reference volume is volumetrically calibrated; and/or
wherein, for the purpose of ascertaining the reference volume, a mathematical function which represents a relationship between a filling level in the container and the corresponding filling volume is formed.

8. The system as claimed in claim 1, wherein the learning mode further comprises the following step:
determining a volume flow via the liquid inlet into the container in the open valve position, taking into account an ascertained volume value of the reference volume and the detected time period.

9. The system as claimed in claim 8, wherein the learning mode further comprises the following steps:
determining a relationship between an output value of the at least one pressure sensor and a filling level in the container; and/or
determining a relationship between an output value of the at least one pressure sensor and a corresponding filling volume in the container.

10. A commercial dishwasher, comprising a system as claimed in claim 1, wherein the container for temporarily storing liquids is a fresh water container and/or a fresh water heater.

11. A system for ascertaining fresh water consumption by a commercial dishwasher or a component thereof, wherein the system comprises:
a container for temporarily storing liquids, wherein the container has a liquid inlet, which can be flow-connected to a fresh water source if required, and a liquid outlet, which can be flow-connected to a freshwater consuming means of the dishwasher, if required;
at least one pressure sensor for detecting a hydrostatic pressure in the container; and
an evaluation device which is designed to ascertain a fresh water volume flow into the container depending on at least one output value of the at least one pressure sensor;
wherein the container is a boiler that includes a heater therein, and the at least one pressure sensor comprises a pressure sensor that detects hydrostatic pressure in the boiler.

* * * * *